(12) United States Patent
Somani

(10) Patent No.: US 7,573,996 B1
(45) Date of Patent: Aug. 11, 2009

(54) PRESENCE BASED CALLBACK

(75) Inventor: Anand H. Somani, Fremont, CA (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 11/542,295

(22) Filed: Oct. 3, 2006

(51) Int. Cl.
H04M 3/42 (2006.01)

(52) U.S. Cl. .............................. 379/210.01; 379/93.23; 379/142.06; 379/88.17

(58) Field of Classification Search ............ 379/210.01, 379/265.02, 265.09, 88.17, 93.05, 211.02
See application file for complete search history.

(56) References Cited

U.S. PATENT DOCUMENTS

| | | | |
|---|---|---|---|
| 4,817,130 A | 3/1989 | Frimmel, Jr. | |
| 4,941,168 A | 7/1990 | Kelly, Jr. | |
| 5,003,577 A | 3/1991 | Ertz et al. | |
| 5,185,782 A | 2/1993 | Srinivasan | |
| 5,206,903 A | 4/1993 | Kohler et al. | |
| 5,329,578 A | 7/1994 | Brennan et al. | |
| 5,341,414 A | 8/1994 | Popke | |
| 5,371,534 A | 12/1994 | Dagdeviren et al. | |
| 5,410,343 A | 4/1995 | Coddington et al. | |
| 5,430,792 A | 7/1995 | Jesurum et al. | |
| 5,434,908 A | 7/1995 | Klein | |
| 5,511,112 A | 4/1996 | Szlam | |
| 5,555,376 A | 9/1996 | Theimer et al. | |
| 5,712,902 A | 1/1998 | Florence et al. | |
| 5,742,763 A | 4/1998 | Jones | |
| 5,802,510 A | 9/1998 | Jones | |
| 5,819,084 A | 10/1998 | Shapiro et al. | |
| 5,826,039 A | 10/1998 | Jones | |
| 5,828,747 A | 10/1998 | Fisher et al. | |
| 5,864,874 A | 1/1999 | Shapiro | |
| 5,905,793 A | 5/1999 | Flockhart et al. | |
| 5,982,873 A | 11/1999 | Flockhart et al. | |
| 6,018,655 A | 1/2000 | Bartle et al. | |
| 6,031,896 A | 2/2000 | Gardell et al. | |
| 6,038,296 A | 3/2000 | Brunson et al. | |
| 6,046,762 A | 4/2000 | Sonesh et al. | |
| 6,068,188 A | 5/2000 | Knowles | |
| 6,088,441 A | 7/2000 | Flockhart et al. | |

(Continued)

FOREIGN PATENT DOCUMENTS

EP 0 886 416 12/1998

(Continued)

OTHER PUBLICATIONS

U.S. Appl. No. 11/626,217, filed Jan. 23, 2007, Coughlan.

(Continued)

Primary Examiner—Curtis Kuntz
Assistant Examiner—Karen L Le
(74) Attorney, Agent, or Firm—Sheridan Ross P.C.

(57) ABSTRACT

The present invention provides presence-aware systems. More specifically, methods and systems are provided that enable a contact center to utilize presence information when servicing a contact. When the presence of a particular customer is detected, such information may be provided to or otherwise ascertained by the contact center. Once the contact center has the presence information it may use it to determine how best to call back the customer such that it is convenient for the customer and an agent of the contact center.

25 Claims, 5 Drawing Sheets

U.S. PATENT DOCUMENTS

| | | | |
|---|---|---|---|
| 6,094,681 A | 7/2000 | Shaffer et al. | |
| 6,128,304 A | 10/2000 | Gardell et al. | |
| 6,130,937 A | 10/2000 | Fotta | |
| 6,144,644 A | 11/2000 | Bajzath et al. | |
| 6,154,738 A | 11/2000 | Call | |
| 6,163,607 A | 12/2000 | Bogart et al. | |
| 6,167,266 A | 12/2000 | Havinis et al. | |
| 6,169,795 B1 | 1/2001 | Dunn et al. | |
| 6,173,053 B1 | 1/2001 | Bogart et al. | |
| 6,185,603 B1 | 2/2001 | Henderson et al. | |
| 6,188,756 B1 | 2/2001 | Mashinsky | |
| 6,192,122 B1 | 2/2001 | Flockhart et al. | |
| 6,199,048 B1 | 3/2001 | Hudetz et al. | |
| 6,226,360 B1 | 5/2001 | Goldberg et al. | |
| 6,272,319 B1 | 8/2001 | Narusawa | |
| 6,298,062 B1 | 10/2001 | Gardell et al. | |
| 6,307,931 B1 | 10/2001 | Vaudreuil | |
| 6,310,947 B1 | 10/2001 | Polcyn | |
| 6,311,231 B1 * | 10/2001 | Bateman et al. | 379/265.09 |
| 6,317,593 B1 | 11/2001 | Vossler | |
| 6,330,243 B1 | 12/2001 | Strandberg | |
| 6,330,317 B1 | 12/2001 | Garfinkel | |
| 6,332,081 B1 | 12/2001 | Do | |
| 6,360,222 B1 | 3/2002 | Quinn | |
| 6,408,177 B1 | 6/2002 | Parikh et al. | |
| 6,411,682 B1 | 6/2002 | Fuller et al. | |
| 6,430,271 B1 | 8/2002 | DeJesus et al. | |
| 6,430,602 B1 | 8/2002 | Kay et al. | |
| 6,449,260 B1 | 9/2002 | Sassin et al. | |
| 6,456,711 B1 | 9/2002 | Cheung et al. | |
| 6,463,299 B1 | 10/2002 | Macor | |
| 6,477,105 B2 | 11/2002 | Wu | |
| 6,477,373 B1 | 11/2002 | Rappaport et al. | |
| 6,477,374 B1 | 11/2002 | Shaffer et al. | |
| 6,480,484 B2 | 11/2002 | Morton | |
| 6,535,600 B1 | 3/2003 | Fisher et al. | |
| 6,546,097 B1 | 4/2003 | Peltz | |
| 6,549,612 B2 | 4/2003 | Gifford et al. | |
| 6,614,783 B1 | 9/2003 | Sonesh et al. | |
| 6,636,587 B1 | 10/2003 | Nagai et al. | |
| 6,665,534 B1 | 12/2003 | Conklin et al. | |
| 6,738,462 B1 | 5/2004 | Brunson | |
| 6,741,586 B1 | 5/2004 | Schuster et al. | |
| 6,750,897 B1 | 6/2004 | Moshrefi et al. | |
| 6,788,773 B1 | 9/2004 | Fotta | |
| 6,789,120 B1 | 9/2004 | Lee et al. | |
| 6,868,395 B1 | 3/2005 | Szlam et al. | |
| 6,871,062 B2 | 3/2005 | Trop et al. | |
| 6,879,677 B2 * | 4/2005 | Trandal et al. | 379/215.01 |
| 6,879,828 B2 | 4/2005 | Virtanen et al. | |
| 6,891,933 B2 | 5/2005 | Kumamoto | |
| 6,925,166 B1 | 8/2005 | Chan | |
| 6,968,052 B2 * | 11/2005 | Wullert, II | 379/210.01 |
| 6,968,179 B1 | 11/2005 | De Vries | |
| 6,988,126 B2 | 1/2006 | Wilcock et al. | |
| 6,999,731 B2 | 2/2006 | Cronin | |
| 7,023,980 B2 | 4/2006 | Lenard | |
| 7,027,586 B2 | 4/2006 | Bushey et al. | |
| 7,054,939 B2 | 5/2006 | Koch et al. | |
| 7,068,762 B2 | 6/2006 | Skladman et al. | |
| 7,080,321 B2 | 7/2006 | Aleksander et al. | |
| 7,092,370 B2 | 8/2006 | Jiang et al. | |
| 7,158,630 B2 | 1/2007 | Fotta et al. | |
| 7,215,760 B2 | 5/2007 | Lenard | |
| 7,248,677 B2 | 7/2007 | Randall et al. | |
| 7,269,247 B2 | 9/2007 | Mashinsky | |
| 2001/0006893 A1 | 7/2001 | Yoshioka | |
| 2001/0019816 A1 | 9/2001 | Kumar | |
| 2001/0042126 A1 | 11/2001 | Wong et al. | |
| 2001/0053214 A1 | 12/2001 | Kleinoder et al. | |
| 2001/0054037 A1 | 12/2001 | Shapiro et al. | |
| 2002/0019829 A1 | 2/2002 | Shapiro | |
| 2002/0021307 A1 | 2/2002 | Glenn et al. | |
| 2002/0032040 A1 | 3/2002 | Tsukamoto | |
| 2002/0035594 A1 | 3/2002 | Dreke et al. | |
| 2002/0035605 A1 | 3/2002 | McDowell et al. | |
| 2002/0052225 A1 | 5/2002 | Davis et al. | |
| 2002/0055350 A1 | 5/2002 | Gupte et al. | |
| 2002/0055975 A1 | 5/2002 | Petrovykh | |
| 2002/0065894 A1 | 5/2002 | Dalal et al. | |
| 2002/0069081 A1 | 6/2002 | Ingram et al. | |
| 2002/0076010 A1 | 6/2002 | Sahai | |
| 2002/0076025 A1 | 6/2002 | Liversidge et al. | |
| 2002/0083127 A1 | 6/2002 | Agrawal | |
| 2002/0085701 A1 | 7/2002 | Parsons et al. | |
| 2002/0086672 A1 | 7/2002 | McDowell et al. | |
| 2002/0087630 A1 | 7/2002 | Wu | |
| 2002/0097856 A1 | 7/2002 | Wullert, II | |
| 2002/0098831 A1 | 7/2002 | Castell et al. | |
| 2002/0116336 A1 | 8/2002 | Diacakis et al. | |
| 2002/0116461 A1 | 8/2002 | Diacakis et al. | |
| 2002/0120687 A1 | 8/2002 | Diacakis et al. | |
| 2002/0126701 A1 | 9/2002 | Requena | |
| 2003/0014491 A1 | 1/2003 | Horvitz et al. | |
| 2003/0018720 A1 | 1/2003 | Chang et al. | |
| 2003/0028621 A1 | 2/2003 | Furlong et al. | |
| 2003/0073440 A1 | 4/2003 | Mukherjee et al. | |
| 2003/0110228 A1 | 6/2003 | Xu et al. | |
| 2003/0130864 A1 | 7/2003 | Ho et al. | |
| 2003/0195811 A1 | 10/2003 | Hayes et al. | |
| 2004/0010431 A1 | 1/2004 | Thomas et al. | |
| 2004/0120498 A1 | 6/2004 | Sylvain | |
| 2004/0141594 A1 | 7/2004 | Brunson | |
| 2004/0189698 A1 | 9/2004 | Bokish | |
| 2005/0031107 A1 | 2/2005 | Fotta | |
| 2005/0163104 A1 | 7/2005 | Christensen et al. | |
| 2005/0187781 A1 | 8/2005 | Christensen et al. | |
| 2005/0216848 A1 | 9/2005 | Thompson et al. | |
| 2005/0276407 A1 | 12/2005 | Mohler | |

FOREIGN PATENT DOCUMENTS

| | | |
|---|---|---|
| EP | 1261179 | 11/2002 |
| JP | 9-200813 | 7/1997 |
| JP | H11-046377 | 2/1999 |
| JP | 11-088495 | 3/1999 |
| JP | H11-205837 | 7/1999 |
| JP | 2000-102059 | 4/2000 |
| JP | 2000-312258 | 11/2000 |
| JP | 2001-189774 | 7/2001 |
| JP | 2001-224075 | 8/2001 |
| JP | 2001-251395 | 9/2001 |
| JP | 2001-350782 | 12/2001 |
| JP | 2002-094614 | 3/2002 |
| JP | 2002-101155 | 4/2002 |
| JP | 2002-108794 | 4/2002 |
| JP | 2002-152335 | 5/2002 |
| JP | 2002-176449 | 6/2002 |
| JP | 2003-8655 | 1/2003 |
| JP | 2003-116175 | 4/2003 |
| JP | 2003-517781 | 5/2003 |
| JP | 2003-169147 | 6/2003 |
| JP | 2004-013303 | 1/2004 |
| WO | WO 97/24010 | 7/1997 |
| WO | WO 98/03923 | 1/1998 |
| WO | WO 98/12644 | 3/1998 |
| WO | WO 01/45368 | 6/2001 |
| WO | WO 01/69387 | 9/2001 |
| WO | WO 02/30105 | 4/2002 |
| WO | WO 03/025776 | 3/2003 |

WO    WO 03/085539    10/2006

OTHER PUBLICATIONS

Background of the Invention of the above-captioned application (previously provided).
U.S. Appl. No. 11/621,350, Lenard.
U.S. Appl. No. 11/549,448, Brunson et al.
U.S. Appl. No. 10/865,114, Craft.
CC News: Call Center Technology, "FaceTime gives voice, vision to instant messaging", available at http://www.ccnews.com/may2000/depts/cct/cctstory2.htm, 2 pages; Copyright 2000, 1999.
e-Vantage Solutions, "Customer Service Window", available at http://www.evgl.com/dsw.html, 2 pages, 2003.
FaceTime Communications Press Release, "Amica Insurance Selects Face Time Communications to Provide Instant Messaging-Based Customer Service in Enterprise" (Jun. 25, 2001), available at http://www.factime.com/pr/pr010625.shtm, 2 pages.
FaceTime Communications website, "Customer Services", available at http://www.facetime.com/custsvcs.shtm, 4 pages, 2003.
FaceTime Communications website, "Overview", available at http://www.facetime.com/solutions.shtm, 4 pages, 2003.
FaceTime Communications website, "Presence Management", available at http://www.facetime.com/presence.shtm, 3 pages, 2003.
G. Klyne et al., "Instant Messaging using APEX", Network Working Group, Jun. 1, 2001, 19 pages.
Grigonis, Computer Technology Encyclopedia (2000) pp. 342-345, 389-392.
J. Rosenberg et al., "SIP extentions for Instant Messaging", Internet Engineering Task Force, Jul. 18, 2001, 22 pages.
Live2Support, "Features", Available at http://web.archive.org/web/20040206215142/www.live2support.com/features_live_chat.php>, undated, 4 pages.
"MIT Project Oxygen Publications", 2 pages, undated.
Ovisoft Technologies, "Ovisoft Messenger—Call Center Solutions", available at http://www.ofisoft.com/solutioncallcenter.htm, 1 page, 2003.
Salvator, Dave, "Review: Skype Voice Chat", Available at http://www.findarticles.com/particles/mi_zdext/is_200310/ai_ziff109903>, Extreme Tech, Oct. 2003, 2 pages.
Schulzrinne, H., et al., "The Session Initiation Protocol: Internet-Centric Signaling", IEEE Communications Magazine (Oct. 2000), vol. 38, No. 10, pp. 134-141.
Stephanie Losi, "Instant Messaging for Call Centers Leaves 'Em Smiling" www.CRMDaily.com (Jun. 4, 2001), available at http://www.newsfactor.com/perl/story/10246.html, 3 pages.
Steve Taylor et al., "SIP in the call center" Network World Convergence Newsletter (Aug. 27, 2003), available at http://www.nwfusion.com/newsletters/converg/2003/0825converge2.html, 4 pages.
Trudy Walsh, "Instant messaging boosts service at Texas call center" GCN (Nov. 2001), available at http://www.gcn.com/cgi-bin/udt/im.display.printable?client.id=state2&story.id=16765, 2 pages.
Venus Valley, "Live chat for your website", Available at http://www.pppindia.com/vvchat/shots.htm>, Venus Valley Live Support, 2003, 2 pages.
WiredRed News Release, "WiredRed to Provide Secure Instant Messaging for Eight New Call Center Customers", available at http://www.wiredred.com/news_release_callctr.html, 2 pages, Sep. 28, 2002.
XML-NS Tim Bray et al., "Namespaces in XML", W3C recommendation: xml-names, Jan. 14, 1999, 12 pages.
"Phone Mail Override for Imcoming Calls", IBM Technical Disclosure Bullitin, vol. 37, No. 11, Nov. 1994.
"CallWave Launches Mobile Call Screening and Mobile Call Transfer for Cell Phones; First Network-Independent VoIP Application to Deliver wireless/Wireline Convergence"; Callwave, Inc.; Internet Article printed from http://investor.callwave.com/phoenix.zhtml?c=180005&p=irol-newsArticle_print&ID=651; Dec. 7, 2004; 2 pages.

U.S. Appl. No. 10/367,260, Zmolek.
Richard Grigonis, *Computer Telephony Encyclopedia* (2000) pp. 367-375.
Richard Grigonis, *Computer Telephony Encyclopedia* (2000) pp. 413-430.
Richard Shockey, "ENUM: Phone Numbers Meet the Net" www.cConvergence.com (Jul. 2001) pp. 21-30.
Bill Michael, "The Politics of Naming" www.cConvergence.com (Jul. 2001) pp. 31-35.
The MIT Oxygen Project, Cambridge, MA, Apr. 25-26, 2000, 9 pages.
MIT Project Oxygen, "Oxygen: Pervasive, Human-Centered Computing" MIT Laboratory for Computer Science, MIT Artificial Intelligence Laboratory (May 2002), 18 pages.
Sugano et al. ;"Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.
Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.
Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.
Rose et al..; "The APEX Presence Service," Network Working Group (Jan. 14, 2002), available at http://www.ietf.org/internet-drafts/draft-ietf-apex-presence-06.txt, 31 pages.
Day et al.; "A Model for Presence and Instant Messaging," Network Working Group (Feb. 2000), available at http://www.ietf.org/rfc/rfc2778.txt?number=2778, 16 pages.
Day et al.; "Instant Messaging/Presence Protocol Requirements," Network Working Group (Feb. 2000), available at http://www.ieft.org/rfc/rfc2779.txt?number=2779, 25 pages.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
Fielding et al.; "Hypertext Transfer Protocol—HTTP/1.1," Network Working Group, Request for Comments 2068 (Jan. 1997), 152 pages.
Berners-Lee et al.; "Uniform Resource Identifiers (URI); Genetic Syntax," Network Working Group, Request for Comments 2396 (Aug. 1998), 38 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
Holtman et al.; "Transparent Content Negotiation in HTTP," Network Working Group (Mar. 1998), available at http://www.ietf.org/rfc/rfc2295.txt?number=2295, 55 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Dawson et al.; "Vcard MIME Directory Profile," Network Working Group (Sep. 1998), available at http://www.ietf.org/rfc/rfc2426.txt?number=2426, 40 pages.
Andy Zmolek; "Simple and Presence: Enterprise Value Propositions," Avaya presentation, 16 pages, presented Jan. 24, 2002.
Chavez, E., et al.; Abstract of "Interactive applications of personal situation-aware assistants"; *Computers and Graphics*, Pergamon Press Ltd., Oxford, GB, vol. 23, No. 6, Dec. 1999, pp. 903-915, XP004187839, ISSN: 0097-8493.

* cited by examiner

| Customer Identifier 204 | Presence Account 208 | Permissions 212 | Current Status 216 | Okay to Call Back? 220 |
|---|---|---|---|---|
| User A | Chat, IM, Cellular | M-F, 8:00AM to 5:00PM | 12:35PM, Monday Located on IM | YES |
| User B | Cellular, Email | T-F, 12:30PM to 7:00PM NOT F 1:00PM to 3:00PM | 2:43PM, Friday Located on Cellular Phone | NO |
| User N | IM | T-R, 8:00AM to 1:00PM | 8:15AM, Thursday Not Located | NO |

*Fig. 2*

PRESENCE BASED CALLBACK

FIELD OF THE INVENTION

The present invention is directed generally to telephony networks and specifically to presence-aware telephony networks.

BACKGROUND OF THE INVENTION

The convergence of the mobile telephone network, the static telephone network, and the IP network provides a myriad of communication options for users. If one seeks to contact another individual, he or she may do so by electronic mail or e-mail, Instant Messaging (IM), wired or wireless telephone, personal computer, pager, personal digital assistant or PDA, and Unified Messaging or UM systems, to name but a few. With so many options, it is difficult, if not impossible, to determine which option at a given point in time will provide the caller with the highest likelihood of contacting the desired individual or contactee. Trial and error and guesswork are the typical techniques used to contact the contactee, which more often than not leads to a waste of time and frustration on the part of the contactor.

Various attempts have been made to provide a presence aware network, which would temporally track an individual's usage of selected communication devices to provide a contactor with the highest likelihood of contacting the individual. Most recently, the Session Initiation Protocol or SIP (which is a simple signaling/application layer protocol for data network multimedia conferencing and telephony) has been developed to provide a degree of presence awareness in a communication network. Although other protocols are equally supportive of presence concepts, SIP provides an illustrative basis for the present invention.

In SIP, end systems and proxy servers can provide services such as call forwarding, contactee and contactor number delivery (where numbers can be any naming scheme such as a conventional URL format), personal mobility (the ability to reach a contactee under a single, location-independent address even when the contactor changes terminals), terminal-type negotiation and selection (e.g., a contactor can be given a choice on how to reach the contactee), mobile phone answering service, terminal capability negotiation, contactor and contactee authentication, blind and supervised call transfer, and invitations to multicast conferences.

To provide these varied services, SIP uses a relatively simple message system, namely an "INVITE" message (with the contactor's codec preferences) and an "OK" message (with the contactee's codec preferences), and various software entities, namely registrars which maintain a map of the addresses of a given user at the current time, proxies which perform call routing, session management, user authentication, redirect functions, and routing to media gateways, redirect servers which perform a subset of forwarding functions, and SIP location servers which maintain user profiles and provide subscriber registration. "Registration" is a mechanism whereby a user's communication device registers with the network each time he or she comes online and individual profiles are accessed that specify information for routing based on a number of different criteria.

Many contact centers have been enabled with some sort of callback functionality associated with a callback application. However, most callback applications require a fixed number or email address to call back a customer and these applications do not usually have the ability to check if the customer is available on the fixed number or email address when the contact center agent is ready to call back the customer. Rather, most contact centers employ static content callback applications meaning that there is no state check to find the best way to reach the customer nor does the application determine if it is a good time to call back the customer.

One can imagine a situation where a contact center agent has figured out an answer to a customer's question and is ready to call back the customer. The agent may check for a callback number or email address and simply attempt to callback the customer using one or both of these mediums. In the case of the agent calling back the customer using a phone number provided by the customer (e.g., home phone number, work number, cellular phone number, etc.), the agent may be interrupting the customer during an important meeting. On the other hand, if the agent simply sends an email to the customer there is no verification that the message was received by the customer. The email message may go unread by the customer if he/she does not have access to email for an extended period of time. This may be problematic if the customer required a resolution from the contact center agent relatively quickly.

There are products that exist which allow a customer to specify a time that he/she would like to be called back at. However, when a customer specifies a time that he/she would like to be called back there is no guarantee that the contact center agent will be able to reach the customer during the specified time. If the contact center agent is unable to reach the customer then additional frustration is introduced because the contact center agent will likely need to call back the customer again at a later time. All of these problems introduce inefficiencies in contact center performance, which may ultimately lead to an overall loss in profitability for the contact center.

SUMMARY

These and other needs are addressed by various embodiments and configurations of the present invention. The present invention is directed generally to callback features integrated with presence awareness systems. More specifically, a contact center customer may provide a contact center or contact center agent access to presence information for the contact initiator such that the contact recipient can successfully reach the contact initiator at a later time when the presence of the contact center customer is detected.

In accordance with one embodiment of the present invention, a method for servicing a contact in a contact center is provided. The method generally comprises the steps of:

(a) receiving a first contact in the contact center;

(b) determining that the first contact is to be terminated and at least partially serviced offline;

(c) receiving access to presence information from an initiator of the first contact;

(d) terminating the first contact;

(e) deciding to call back the initiator of the first contact;

(f) retrieving presence information from a presence service that is operable to monitor a presence of the initiator on at least one communication device;

(g) analyzing the retrieved presence information to determine a presence status of the initiator; and (h) performing at least one of the following substeps:

(i) in the event that a positive presence status has been determined for the initiator, attempting to contact the initiator on a communication device associated with the initiator's presence; and (ii) in the event that a negative presence status has been determined for the initiator, waiting to contact the initiator at a later time.

As used herein, a "contact" can include any type of resource request or communication including a voice call, email, chat, video call, fax, and combinations thereof. Accordingly, a contact center agent or other representative from a contact center (e.g., an automatic dialer, a contact center supervisor, etc.) may decide to "call back" an initiator or contact center customer using one or a combination of such mediums.

Access to presence information may be provided to a contact center or a contact center representative via a number of modalities. For example, a customer may provide a contact center or contact center representative with a token or the like that can be used to access presence information on a separate presence aware service. The token may include an identifier for the customer along with a password to access such presence information from the presence aware service. Additionally, the token may include restrictions that limit the availability of use by the contact center or contact center representative. Thus, a contact center customer can define when they would like to be called back and can further limit when they are called back depending upon their schedule. For instance, if the contact center customer knows that he/she will be in a meeting between 10:00 AM and 2:00 PM on a Thursday, then the token can be limited such that the contact center or contact center representative is unable to gain presence information for the contact center customer during the specified time. This helps ensure that the contact center representative does not accidentally try to call back the contact center customer while he/she is attending the meeting.

Moreover, the token can define preferred communication devices that the customer would like to be called back on. Specifically, a customer may primarily prefer to be called back on their cellular phone. If their presence is not detected on the cellular phone, then the customer may specify that they would like to be contacted on their personal computer via IM. Thus, if the customer's presence is detected on both communication devices, then the contact center representative can choose to contact the customer via the cellular phone due to the customer's preferences.

By waiting until the presence of a customer is detected, the time of a contact center representative is not unnecessarily wasted. Instead, when the contact center representative has determined that they are ready to call back the customer but the customer's presence is not yet detected on any communication device associated with the customer, then the contact center representative can refocus their efforts on other endeavors rather than wasting time trying to contact the customer. Moreover, the contact center customer can be assured that they will only be called back when they want and how they want.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

FIG. 2 is a block diagram depicting an exemplary data structure that can be employed according to embodiments of the present invention;

DETAILED DESCRIPTION

The invention will be illustrated below in conjunction with an exemplary communication system. Although well suited for use with, e.g., a system using server(s), the invention is not limited to use with any particular type of communication system or configuration of system elements. Those skilled in the art will recognize that the disclosed techniques may be used in any communication application in which it is desirable to track the presence of an individual or customer such that they can be contacted in an efficient manner.

Figure 1:
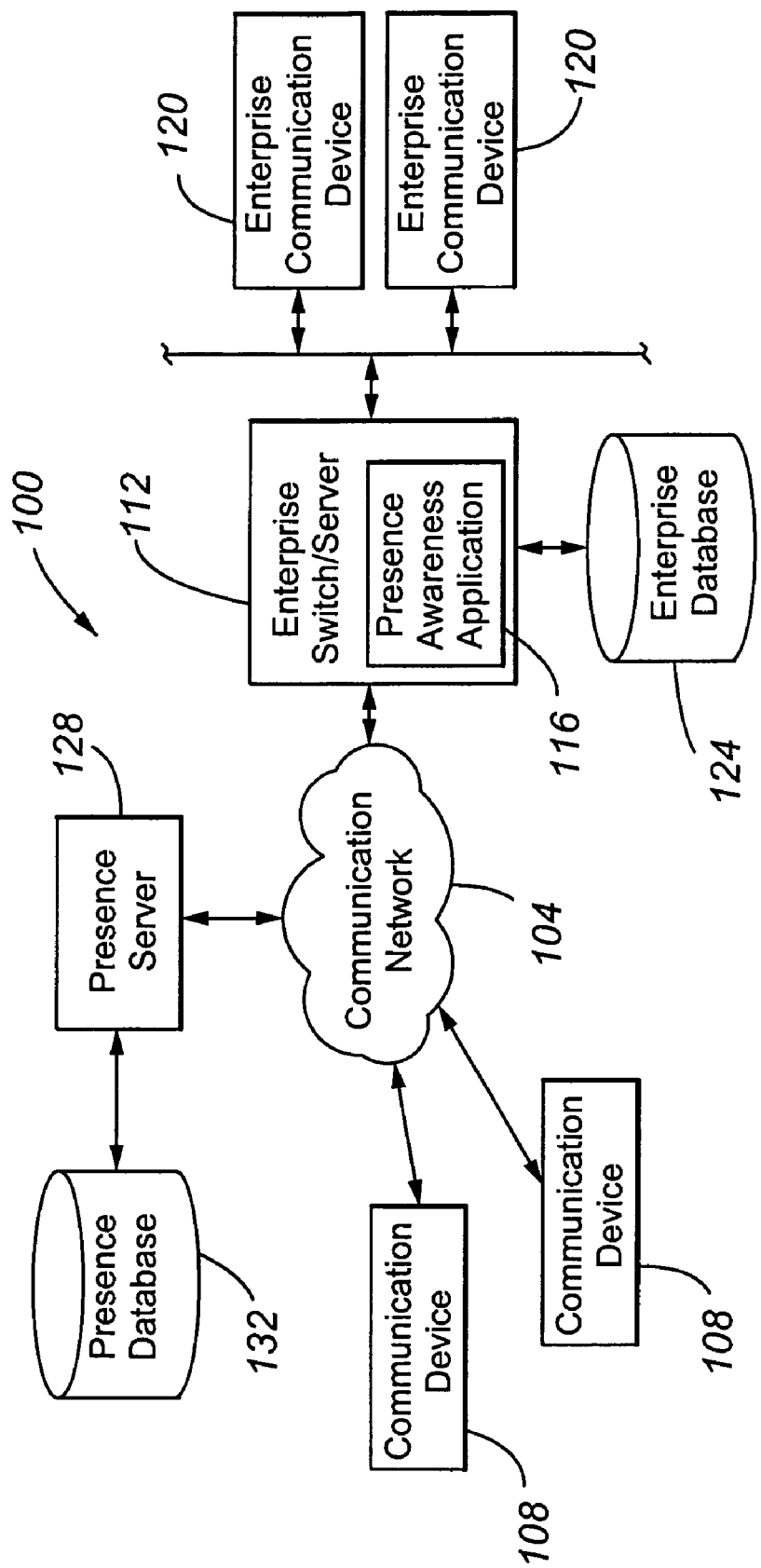
FIG. 1 is a block diagram of a presence aware communications system according to embodiments of the present invention.

FIG. 1 shows a communication system 100 in accordance with at least one embodiment of the present invention. The communication system 100 generally comprises a communication network 104 connecting a plurality of communication devices 108 to an enterprise switch/server 112. The enterprise switch/server 112 provides a connection platform for a plurality of enterprise communication devices 120 connected thereto. Generally, the enterprise communication devices 120 are connected to the enterprise switch/server 112 through links and each enterprise communication device 120 is registered with the enterprise switch/server 112 with a unique identifier or extension. Communication devices 108 are able to communicate with the enterprise communication devices 120 through the enterprise switch/server 112.

The communication network 104 may comprise any type of information transportation medium and may use any type of protocols to transport messages between endpoints. The communication network 104 may include wired and/or wireless communication technologies. Examples of the communication network 104 include, without limitation, a standard Plain Old Telephone System (POTS), an Integrated Services Digital Network (ISDN), a Public Switched Telephone Network (PSTN), a Local Area Network (LAN), a Wide Area Network (WAN) like the Internet, and any other type of packet-switched or circuit-switched network known in the art.

The communication devices 108, 120 may be packet-switched or circuit-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and conventional wired or wireless telephones.

The enterprise switch/server 112 can be any architecture for directing contacts from communication devices 108 to one or more communication devices 120 and vice versa. In some embodiments, the enterprise switch/server 112 may perform load-balancing functions by allocating incoming or outgoing contacts among a plurality of logically and/or geographically distinct contact centers. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch/server 112 typically includes a network interface card (not shown) to provide services to the serviced communication devices. Other types of known switches and servers are well known in the art and therefore not described in detail herein.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

The enterprise switch/server 112 may comprise a presence awareness application 116 for executing presence awareness functions in connection with communication devices 108. The presence awareness application 116, which represents one type of presence awareness service, may be implemented using embedded software, firmware, or as a plug-in application.

The enterprise switch/server 112 may be connected to an enterprise database 124 for storing information related to inbound and/or outbound contacts serviced by the enterprise switch/server 112. Specifically, presence information and data used to access presence information like a presence access token can be stored in the enterprise database 124 along with other information related to customer's who have previously contacted the enterprise switch/server 112.

The enterprise switch/server 112, enterprise communication devices 120, and enterprise database 124 are generally used in connection with a contact center or the like. The contact center is capable of receiving and servicing contacts placed by the communication devices 108 as well as placing outbound contacts to communication devices 108 depending upon the contact center's intended use. For example, the contact center may be associated with a help desk or customer service center where inbound contacts are received and agents associated with the enterprise communication devices 120 address questions or other concerns. Alternatively, the contact center may be used as an outbound contact center that helps disseminate information. An example of such a contact center might be implemented in connection with a stock brokerage keeping customer's updated on stock market conditions.

A separate presence server 128 may also be connected to the communication network 104. The presence server 128 may be further connected to a presence database 132, which collectively represents another type of presence aware service. The presence aware server 128 is operable to track and/or detect the presence of an individual through one or more communication devices 108. For example, one individual may be associated with a number of communication devices 108, and the presence server 128 may be operable to detect the presence of that individual on each of the associated communication devices 108. Alternatively, an individual may be associated with a single communication device 108, and the presence aware server 128 may be operable to detect the presence of that individual on the single communication device 108.

In one embodiment, the presence aware server 128 may be a single server used to track the presence of individuals on a number of communication devices. In an alternative embodiment, the presence aware server 128 comprises a collection of different presence aware servers, each of which are responsible for tracking and detecting the presence of an individual on a particular communication device 108.

The presence aware server 128 can then store presence information related to a particular individual (e.g., is a presence detected, where is a presence detected, how long has the presence been detected for, and so on). This information can then be requested by the enterprise switch/server 112 when a contact center representative associated with one of the enterprise communication devices 120 decides that they would like to try and contact the individual. If the presence for that particular individual cannot be found (i.e., the individual has a negative presence status), then the contact center representative can wait until the presence of the individual is detected (i.e., the individual has a positive presence status). The presence information may be provided to the enterprise switch/server 112 in response to a query from the enterprise switch/server 112. In other words, the enterprise switch/server 112 can pull presence information from the presence server 128 when such information is needed. Alternatively, presence information may be provided proactively by the presence server 128 to the enterprise switch/server 112 when the presence of an individual is detected. In this case, the presence server 128 pushes presence information to the enterprise switch/server 112.

The presence aware server 128 may be associated with an entity providing communication services to one or more communication devices 108. For example, the presence aware server 128 may comprise, as an illustrative example, an email server for an email service provider. Other examples of a presence aware server 128 may include, without limitation, an Internet server for providing Internet services, an IM server for providing IM capabilities, a cellular phone switch and/or server for providing cellular phone services, and a pager server for providing pager services. Alternatively, the presence server 128 may be a separate server that is able to gather presence information from one or many of the above-listed service provider servers.

As can be appreciated, presence information provided by a presence aware service such as the presence aware server 128 may include contact information and preferences for receiving contacts that can be defined either directly or indirectly by an individual associated with the communication device 108. Such preferences may be defined when the individual contacts the contact center. Upon contacting the contact center, the individual may be regarded as a customer to the contact center and in the event that a contact center representative desires to call back the customer, presence information may be retrieved from a presence aware service to help ensure that the customer is contacted efficiently and within his/her defined preferences.

Both the presence server 128 and the presence awareness application may be operable to monitor for and detect the presence of a customer on one or more communication devices 108. The presence of a customer may be detected in a number of ways. For example, SIP registrations can be monitored for various applications and if it is determined that a customer has registered with one such application using a particular communication device 108, then it may be determined that the customer has a presence with the particular communication device 108. For example, if a customer logs on to an email account or an IM account, then upon logging on to the application, the presence of that customer may be detected for that application. As another example, if a customer's cellular phone is active and currently registered with a given cellular phone tower, then it may be considered that the customer's presence has been detected in association with his/her cellular phone. Alternatively, a higher level of presence may be required for example, if no calls have been registered with the cellular phone for an extended period of time (e.g., within a predetermined time), then no presence may be determined for that phone, whereas if a call was registered within a relatively recent amount of time, then a presence for the phone may be determined. Of course, various other methods of detecting a customer's presence in association with a communication device are known and are therefore not expanded upon in detail herein.

Referring now to FIG. 2, an example of a data structure 200 used to maintain presence information as well as preferences related thereto will be described in accordance with at least some embodiments of the present invention. The data structure 200 may be stored in the enterprise database 124, the presence database 132, and/or in memory resident on the enterprise switch/server 112 and/or the presence server 128. The data structure 200 may contain a customer identifier field 204 for maintaining customer identification information for up to N customers, where N is generally greater than or equal to one. Customer identification information may include, for example, customer name, customer addresses, customer key (i.e., password), customer identifier, account number, and the like.

The data structure 200 may also include a presence account data field 208 for storing allowable accounts that can be used to track the presence of the customer. The accounts may be associated with various communication devices or different communication modalities the customer can use to interact with the communication network 104. Examples of data that may be stored in the presence account data field 208 include, but are not limited to, communication medium (e.g., voice, text, video, or combinations thereof), communication device 108 (e.g., cellular phone, home phone, work phone, computer, laptop, pager), communication device 108 address or number (e.g., phone number, IM name, email address, pager number, chat account number, communication service provider's server identification numbers), passwords to access such servers, and the like.

Additionally, the data structure 200 may include a permissions field 212. Data stored in the permissions field 212 may define when a particular customer would like to be contacted, how the customer would like to be contacted, and other contact preferences/restrictions. These permissions may be included as a part of a presence access token. The presence access token may include data that can be used to contact a particular customer. However, the permissions may be included in the token to restrict when such data can be accessed. Contact preferences that may be defined by a customer can include preferred call back times, restricted call back times, preferred call back communication devices, restricted call back communication devices, allowable call back times, preferred contact center representatives or enterprises, restricted contact center representatives or enterprises, preferred content (e.g., product or service information), and restricted content.

Further fields that may be included as a part of the data structure 200 are a current status field 216 and a presence status field 220. The current status field 216 may contain current status information relating to the time of day as well as current customer presence information. For example, a presence of User A has been detected on his/her IM account, that information can be reflected in the current status field 216. The data from the current status information field can then be compared to data in the permissions field 212 to determine the customer's presence status. Comparing the current status of User A to the permissions of User A, it can be determined that User A currently has a positive presence status because his/her presence has been detected and contacts to User A are not restricted by data in the permissions field 212. Accordingly, data in the presence status field 220 for User A shows that it is allowable to contact User A.

Of course, there may be instances where the current status of a customer shows that their presence has been detected. However, due to restrictions or other data in the permissions field 212, the presence status for the given customer may be negative. For example, User B's presence has been detected on his/her cellular phone but User B has identified that they do not want to be contacted at particular times. The current time in the current status field 216 shows that User B does not currently want to be contacted and therefore, the presence status of User B is still negative.

If a customer's presence is detected on more than one communication device 108 at the same time, then priorities of communication devices 108 may be compared to determine how best to contact the customer back. The priority of communication devices 108 may be stored in the permissions field 212 as a part of preferred call back communication devices.

As can be appreciated by one of skill in the art, permissions/restrictions as represented in the data structure 200 may not need to be known to a contact center (e.g., enterprise switch/server 112) upfront. This information is typically part of a presence server 128 (e.g., SIP presence tracking system). Typically, the contact center customer sets information in the data structure 200 with a presence tracking service associated with the presence server 128. The enterprise switch/server 112 might not even have access to any such information. Rather, the presence information provided to the switch/server 112 may only be for what the customer has made available at that point. Therefore, if an enterprise communication device 120 is ready to contact a customer during a restricted time then the enterprise communication device 120 may only see a sign "customer not currently available on cellular phone." The enterprise communication device 120 may not see the actual rules or restrictions but rather may only see the result of the implementation of those rules. Therefore, in accordance with one embodiment of the present invention, the enterprise communication device 120 may just get a token from the customer to check presence information from the presence server 128. The passing of the token from the enterprise communication device 120 to the presence server 128 will only result in a response to the enterprise communication device 120 saying that the customer is currently available for contact or not. In other words, restrictions may be set by a customer with the presence server 128 without the enterprise (e.g., contact center) ever being aware of the full extent of those restrictions.

Figure 3:
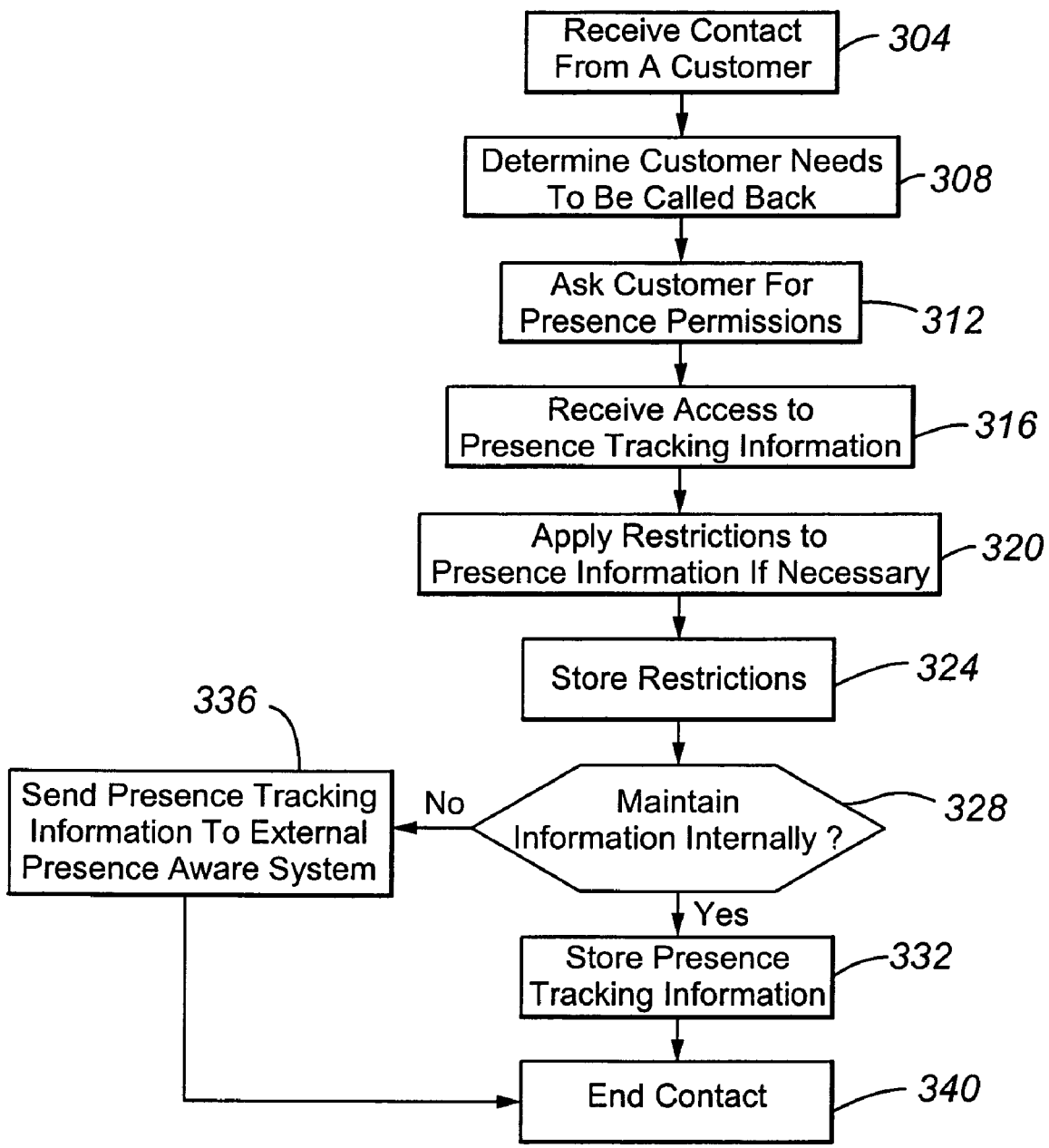
FIG. 3 is a flow chart depicting a method for gaining permissions to presence information in accordance with embodiments of the present invention.

Referring now to FIG. 3, a method of gaining access to presence information will be described in accordance with at least some embodiments of the present invention. The method begins when a contact is received from a customer or an individual in a contact center (step 304). As noted above, once an individual contacts the contact center for the first time, he/she is considered a customer as information can be determined that relates to the given customer. After the customer has contacted the contact center, it is determined that the customer will need to be called back again at a later time (step 308). The customer may need to be called back for a variety of reasons. One such reason might be because the customer has asked a question of a contact center representative and the contact center representative needs to do some research offline before he/she can answer the customer's question. Another reason why a customer may need to be called back is because the customer has requested to be notified whenever a new product related to a certain technology is released. Still another reason why a customer may need to be called back is because the customer has requested stock market or sporting event updates. Other reasons why a customer may require a call back can be imagined for various situations.

Once it is determined that the customer will need to be called back at some point in the future, the customer is asked for presence information and permissions/restrictions related to such presence information (step 312). The customer is then able to supply presence information along with any associated permissions/restrictions to the contact center (step 316). The permissions/restrictions are then applied to the associated presence information to create a presence access token (step 320). The token can include user ID's and passwords used to access various communication services (e.g., an email user name and password, phone number, IM user name and password, etc.) The token also includes the permissions that enable or restrictions that or otherwise disable the token during specified times.

After the presence access token has been created, the token or at least permissions/restrictions related to the token can be stored in the enterprise database 124 (step 324). The token is stored in the enterprise database 124 so that when a contact center representative decides that it is time to try and contact the customer again, it can be determined from local data whether the customer would want to be contacted or not. Such data can be updated by a query sent from the contact center to the presence aware service. The updates to user permissions/restrictions may have been updated at the presence aware service based on a user reconfiguration or the registration of an event for the customer on a new communication device. Thereafter, it is determined if the additional presence information provided will be stored by the contact center (step 328). In this step, the contact center or contact center representative essentially decides whether an external presence aware service will be used and if so whether data will be pulled from or pushed by the external presence aware service. In the event that the presence information and tracking will be performed internally or in the event that presence information will be pulled from an external presence aware service, all of the presence information, which may be totally included in the presence access token, is stored in the enterprise database 124 (step 332). Alternatively, the presence tracking information is sent to the external presence aware system where it may be stored for future use (step 336). In an alternative embodiment, the customer may have already created restrictions with a presence tracking service. The customer then may only give the contact center a token allowing the contact center to query the presence tracking service for presence information. In this embodiment, the token can be sent by the contact center to a presence service when the contact center wants to contact a customer. The presence service can analyze the token and search a presence database to determine if the contact center has access permissions to presence information (i.e., if the customer is available for contact). After the presence tracking information has been properly dealt with, the contact with the customer can end (step 340).

Figure 4:
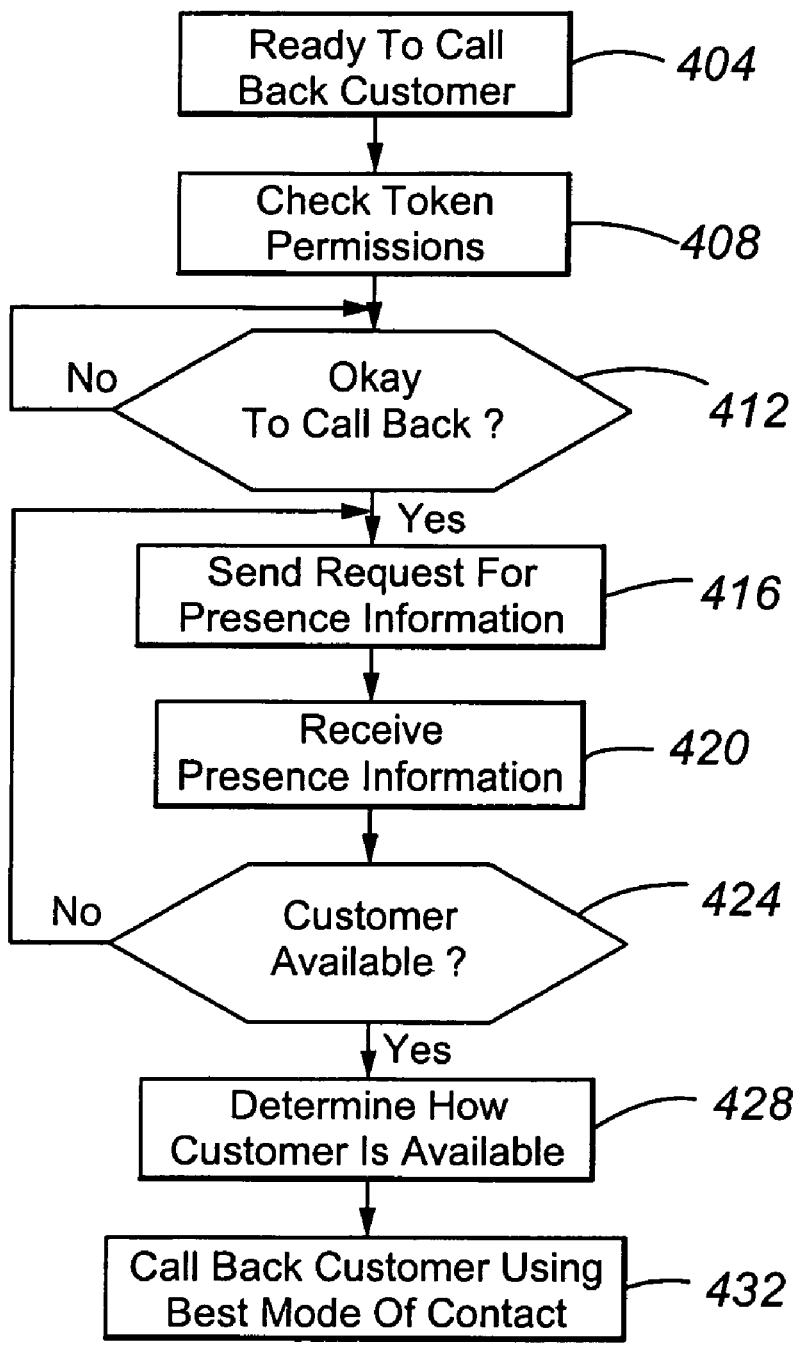
FIG. 4 is a flow chart depicting a method of pulling presence information from a presence aware system in accordance with embodiments of the present invention.

With reference now to FIG. 4, a method of pulling presence information from a presence aware service will be described in accordance with at least some embodiments of the present invention. The method begins when a contact center representative determines that they are ready to call a customer back (step 404). As noted above, the call back may be issued using a conventional phone or the like. Alternatively, a call back may be issued using text messages, emails, pages, faxes, video calls, etc. Once the contact center representative has determined that a call back to a customer is required, permissions/restrictions of the token stored in the enterprise database 124 are checked (step 408). The permissions/restrictions are checked to ensure that the customer is not interrupted when he/she does not want to be.

Based on checking the permissions/restrictions of presence access token, it is determined if it is currently okay to call the customer back (step 412). This check may include comparing a time stamp of the last event performed by the customer with a predetermined time to contact the customer. If the last event time stamp is greater than a predetermined allowable time to contact the customer, then no contact should be attempted because such contact has been "restricted" by the customer. Of course, such information may also be determined at the presence aware service. If it is not okay to contact the customer, then the allowable times of call back are noted and the process waits until such times are reached. Alternatively, if it is okay to call back a customer based on the permissions/restrictions noted in the presence access token, the contact center queries the presence server 128 for presence information (step 416). When the request for the presence information is received by the presence server 128, the relevant presence information is pulled from the presence database 132 or enterprise database 124 and provided back to the contact center (step 420).

The presence information is then analyzed to determine if the customer is currently available, meaning that the customer's presence is detected on at least one communication device 108 associated with the customer (step 424). The presence information may include the current presence status for the identified customer for one or all of the communication devices 108 associated with the customer. If it has already been determined that the current time coincides with an acceptable time to contact the customer, then a negative presence status indicates that the customer's presence is not currently detected on any of the associated communication devices 108, whereas a positive presence status indicates that the customer's presence is detected on at least one of the associated communication devices 108 and. If the customer has a negative presence status as determined in step 420, then the contact center will continue querying the presence server 128 for presence information at predetermined intervals until a positive presence status is received.

Once a positive presence status is received from the presence server 128, it is determined how the customer is available through further analysis of the presence information (step 428). The presence of the customer may only be detected on one communication device 108 and no decisionmaking is necessary to determine how to contact the customer. However, the customer's presence may be detected on multiple communication devices 108 or at least multiple applications associated with the same communication device 108 (e.g., email, IM, and video mail all on the same computer). In this instance, it is determined which communication device 108 or communication medium is most preferred by the customer. Then the preferred communication device 108 or communication medium is used to contact the customer (step 432). If such an attempt fails on the preferred communication device 108 or contact medium, then a second priority communication device 108 or contact medium is used to try and contact the customer.

Figure 5:
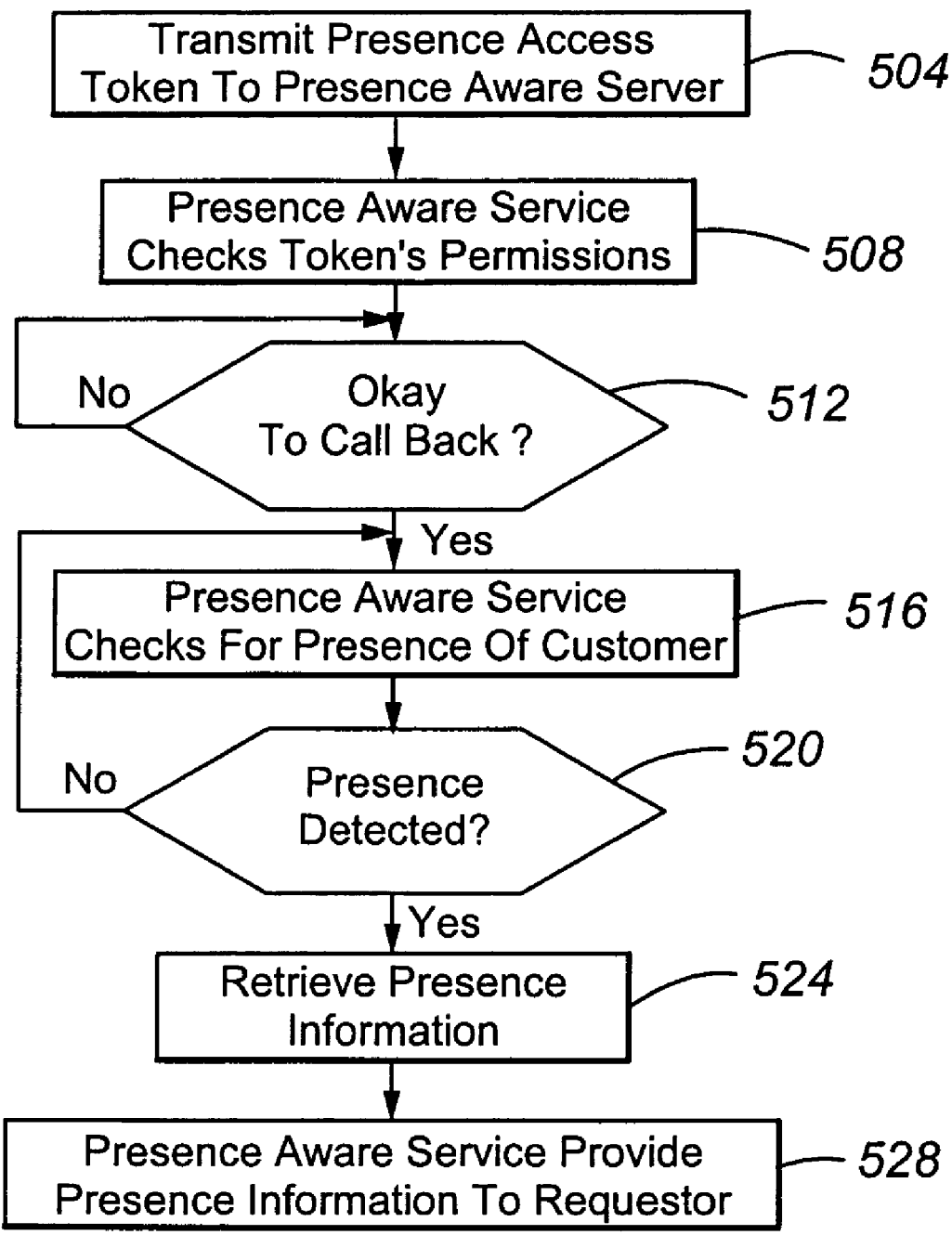
FIG. 5 is a flow chart depicting a method of pushing presence information to a contact center in accordance with embodiments of the present invention.

Referring now to FIG. 5, a method of pushing presence information from a presence aware service will be described in accordance with at least some embodiments of the present invention. Initially, a presence access token is transmitted to a presence aware service (step 504). The token may have been transmitted from a contact center as a notification that a contact center representative is ready to call a customer back.

Upon receipt of the token, the presence aware service checks the token's permissions/restrictions and compares them with the current time (step 508). In an alternative information-pulling embodiment, the token is sent to the presence aware service and the presence aware service checks the customer's predefined contact permissions/restrictions from an internal database. Based on the check it is determined if it is okay for the contact center representative to call the customer back (step 512). If it is not currently okay to call the customer back, then the presence aware service will wait until an appropriate time to call the customer back as defined by the customer. However, if it is currently okay to call the customer back, then the presence aware service checks for the presence of the identified customer (step 516). The presence of a customer can be detected according to a number of known methods. For example, SIP presence tracking methods may be employed whereby various accounts associated with the customer can be checked to see if a communication device is currently interacting using such an account. Alternatively, the activity of phones or similar communication devices may be checked to determine if the customer has presence with those communication devices. Other presence tracking methods employed may include the use of time stamps on the token that is used by the contact center. In one embodiment, if a predetermined amount of time has passed since the customer contacted the contact center the contact center may not be allowed to access presence information or even contact the customer back. Thus the presence of a customer can also be based upon the concept of a time cutoff or the recency of a previous contact.

In step 520 it is determined if the presence aware service detects the presence of the customer on at least one communication device. If no presence is detected, then the process returns to step 516 and the presence aware service will continue monitoring all associated communication devices 108 until the customer's presence is detected on at least one communication device 108. However, if the presence of the customer is detected on at least one communication device 108, then the necessary presence information along with any other required customer preferences is retrieved from the presence database 132 (step 524). The presence aware service then provides the presence information to the contact center (step 528). Once in receipt of the presence information, the contact center representative can determine how to contact the given customer.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for servicing a contact in a contact center, comprising:

receiving a first contact in the contact center;

successfully connecting the first contact with a contact center resource;

thereafter, determining that the first contact is to be disconnected;

receiving access to presence information from an initiator of the first contact;

disconnecting the first contact;

deciding to call back the initiator of the first contact;

sending an access token to a presence service that is operable to monitor a current presence activity of the initiator on one or more communication modalities, wherein the access token provides the presence service with an identifier of the initiator and permissions to distribute current presence information associated with the initiator and the one or more communication modalities to the contact center resource;

receiving current presence activity information associated with the initiator;

analyzing the received current presence information to determine a presence status of the initiator; and performing one of the following substeps:

(i) in the event that a positive presence status has been determined for the initiator, attempting to contact the initiator via a communication modality that is determined to have a current positive presence status for the initiator; and (ii) in the event that a negative presence status has been determined for the initiator on each of the one or more communication modalities, waiting to contact the initiator at a later time.

2. The method of claim 1, wherein the presence service is operably associated with the same enterprise as the contact center.

3. The method of claim 1, wherein the presence service is operably associated with a first enterprise and wherein the contact center is operably associated with a second different enterprise.

4. The method of claim 3, wherein received presence information from the presence service comprises a server operated by the contact center pulling the presence information from a presence server operated by the presence service when it is decided to call back the initiator.

5. The method of claim 3, wherein receiving presence information from the presence service comprises a presence server operated by the presence service pushing the presence information to a server operated by the contact center.

6. The method of claim 5, wherein substep (ii) is performed, further comprising:

the server operated by the contact center sending a request to be notified when the presence status of the initiator changes from the negative presence status to the positive presence status;

the server operated by the presence service monitoring the presence status of the initiator;

the server operated by the presence service determining that the presence status of the initiator has changed to a positive presence status for the at least one communication device;

the server operated by the presence service sending notification to the server operated by the contact center that the presence status of the initiator has changed to a positive presence status; and attempting to contact the initiator via the at least one communication device.

7. The method of claim 1, further comprising:

determining permissions for receiving the presence information at the presence service by analyzing the access token; and restricting the contact center resource from accessing the presence information based on the permissions.

8. The method of claim 7, further comprising:

determining that access to the presence information is restricted after deciding to call back the initiator;

waiting until access to the presence information is not restricted; and when access to the presence information is not restricted, allowing the contact center resource to receive the presence information from the presence service.

9. The method of claim 1, wherein the one or more communication modalities comprise at least one of instant messaging, messaging, paging, and calling.

10. The method of claim 1, further comprising:

creating, by the initiator, restrictions at the presence service related to access of current presence information for the initiator, wherein the contact center is not aware of the full extent of the restrictions;

upon receiving the access token at the presence service, analyzing the access token with respect to the restrictions created by the initiator at the presence service to determine if the contact center resource has access permissions to the current presence information.

11. The method of claim 1, wherein substep (i) is performed, and wherein a positive presence status has been determined for the initiator on at least two communication devices, further comprising:

comparing a user preference for a first of the at least two communication devices to a user preference for a second of the at least two communication devices;

determining that the user preference for the first of the at least two communication devices is greater than the user preference for the second of the at least two communication devices; and selectively attempting to contact the initiator via the first of the at least two communication devices.

12. A computer readable medium comprising executable instructions for performing the steps of claim 1.

13. The method of claim 1, wherein the access token further comprises a presence account data field operable to store information related to accounts that can be used to determine real-time presence information associated with the initiator.

14. The method of claim 1, wherein the receiving access to presence information step is performed while the first contact is successfully connected with the contact center resource.

15. A presence aware communication system, comprising:

a server operable to determine that a first contact received in a contact center has been successfully connected with a contact center resource and, thereafter, disconnected from the contact center resource, the server being operable to receive presence access information from at least one customer associated with the first contact prior to the first contact being disconnected from the contact center resource, the server being further operable to determine that the contact center resource desires to call back the at least one customer and in response send an access token to a presence tracking function that is operable to track a real-time presence activity of the at least one customer, the access token comprising the presence access information obtained from the at least one customer while the first contact was successfully connected with the contact center resource;

a presence tracking function for tracking a real-time presence activity of the at least one customer, retrieving real-time presence information associated with the at least one customer, and determining whether or not to contact the at least one customer based on the real-time presence information; and wherein the server is operable to use the access token to recover presence information from the presence tracking function then place an outbound contact to a communication device which has been associated with a presence of the at least one customer, and wherein the access token comprises an identifier of the at least one customer as well as permissions and restrictions to access real-time presence information for the at least one customer from the presence tracking function.

16. The system of claim 15, wherein the presence information access token is active only when a presence status of the at least one customer comprises a positive presence status.

17. The system of claim 15, wherein the presence information access token comprises at least one of an ID associated with the at least one customer, a password associated with the at least one customer, times in which the at least one customer has requested to be contacted, and a list of communication devices which the at least one customer has requested to be contacted by.

18. The system of claim 15, wherein the server comprises the presence tracking function.

19. The system of claim 15, wherein a second presence tracking server comprises the presence tracking function and wherein the server for placing outbound contacts sends the presence information access token to the second presence tracking server to recover presence information from the second presence tracking server.

20. The system of claim 19, wherein the server for placing outbound contacts sends the presence information access token to the second presence tracking server upon a request for the presence information access token by the second presence tracking server.

21. The system of claim 19, wherein the presence information access token places a restriction on when the server for placing outbound contacts can send the presence information access token to the second presence tracking server.

22. The system of claim 19, wherein the second presence tracking server is operable to receive the presence information access token and wait until the presence of the at least one customer has been identified before the second presence tracking server sends presence information to the server for placing outbound contacts.

23. The system of claim 15, wherein the communication device associated with the initiator's presence comprises at least one of a wired phone, a wireless phone, a cellular phone, a portable email notification device, a pager, a computer, and a laptop.

24. The system of claim 15, wherein the current presence information is pushed from the presence tracking function to the server.

25. The system of claim 15, wherein the current presence information is pulled from the presence tracking function by the server.

* * * * *